Oct. 28, 1958  H. L. CARTER, JR  2,858,491
BYPASS CAPACITORS
Filed Sept. 22, 1953

INVENTOR
HOWELL L. CARTER, JR.
BY *Elmer J. Gorn*
ATTORNEY 2,858,491
Patented Oct. 28, 1958

2,858,491
BYPASS CAPACITORS

Howell L. Carter, Jr., Natick, Mass., assignor to Raytheon Manufacturing Company, Newton, Mass., a corporation of Delaware Application September 22, 1953, Serial No. 381,668

2 Claims. (Cl. 317—257)

This invention relates to capacitors, and more generally to those of annular shape adapted to be mounted about tube sockets for the purpose of providing bypass capacity for certain tube elements. In radio frequency amplifiers for frequencies in excess of thirty megacycles, it is common practice to utilize resonant bypass capacitors. Such capacitors are mounted directly on the chassis by screws or any other convenient fasteners, and in such a way as to insert the minimum of inductance into the circuit. The value of the capacity is chosen to resonate with the inductance of the lead to the electrode that is to be bypassed and other incidental inductances in that part of the circuit. In many applications, it is desirable to have the amplifier pass efficiently as broad a band of frequencies as possible. With such an amplifier, it is desirable to have a broad band bypass circuit. This is accomplished by keeping the ratio of the inductance of the circuit to the capacitance of the bypass capacitor as low as possible. Separate capacitors, one for each electrode or component that is to be bypassed if separately mounted, add considerably to the expense of such amplifiers.

These difficulties are avoided by the construction of the invention which results in a single unit that may incorporate several bypass capacitors with low internal inductance, low base inductance, and low well-defined lead inductance that can be mounted together with the tube socket on the chassis with a minimum of assembly operations and hence with a minimum of expense. The unit itself costs little more than a single capacitor although providing several capacitors. The bypass unit of the invention consists of an annular case of conductive material having openings to receive the same fasteners that secure the associated tube socket to the chassis. Silvered ceramic pieces are soldered into the case and lugs are soldered to the outer silver layer of the ceramic piece in a position most convenient for connecting to the socket lug associated with the pin of the tube electrode to be bypassed. The basic parts can be altered in dimensions and relative position to give a wide variety of capacity values, number of capacitors in a single unit, and the position of the lugs for convenience in connecting into various circuits while preserving the basic construction.

Other and further objects and advantages of the invention will be apparent as the description thereof progresses, reference being had to the accompanying drawings, wherein.

Figure 1:
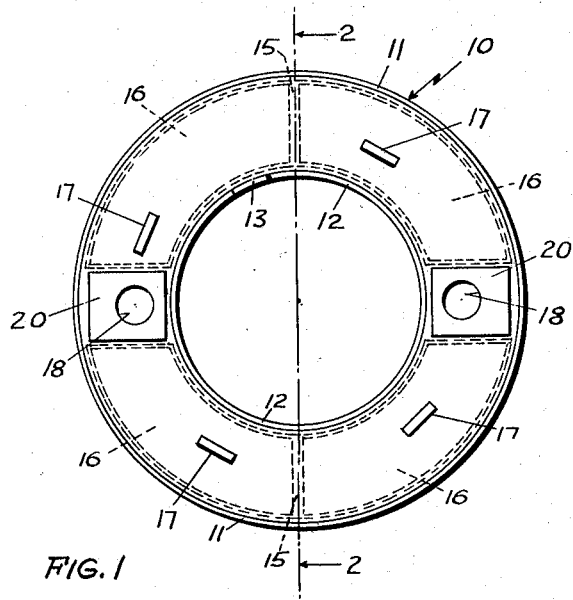
Fig. 1 is a plan view of an embodiment of the invention.
Figure 2:
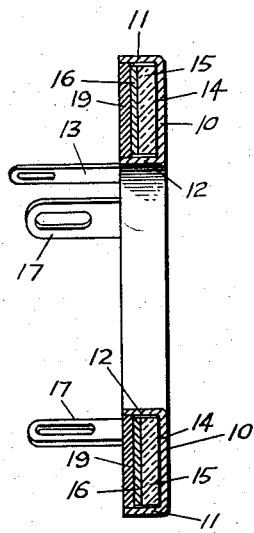
Fig. 2 is a section along the line 2—2 of Fig. 1.

In Figs. 1 and 2, the reference numeral 10 designates an annular ring formed with inner and outer upward turned flanges 11 and 12. The inner flange 11 is extended to form a lug 13 for convenient connection to those parts of the circuit that are to be at ground potential. The case formed by the ring and the flanges has attached to it by solder 14, or otherwise, two pieces 15 of dielectric that may be a ceramic, such as barium titanate. Discrete areas of the top surface of each such piece 15 of dielectric are covered with a layer 16 of conductive material applied by any of the well-known methods to complete the capacitor. In the example shown, four such areas are indicated in dotted lines in Fig. 1. Each such conductive area 16 has attached to it a lug 17 to facilitate connecting the capacitor to the external circuit. Openings 18 are formed in the ring 10 at positions where the mounting screws for the socket, with which the unit is to be associated, may pass through them. Pads 20 are attached to case 10 between the pieces of dielectric 15. These pads have tapped holes into which machine screws may be inserted. Any other well-known fastening method that is convenient may be used. A layer of sealing material 19 is applied over the silvered ceramic pieces to give a rigid moisture proof structure.

Figure 3:
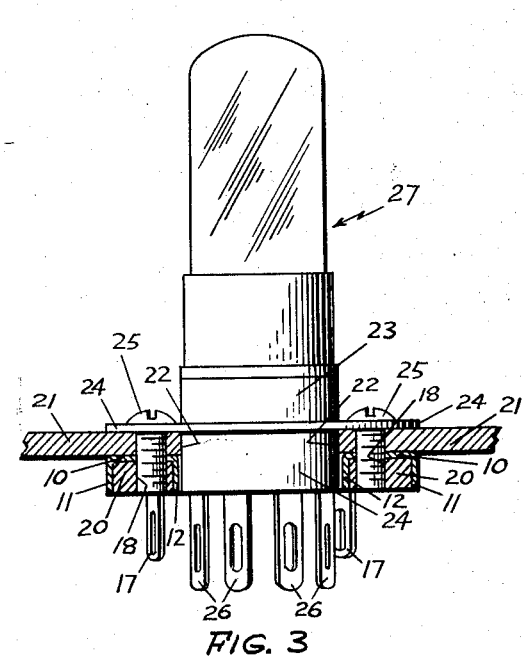
Fig. 3 is a side view partly in section of a capacitor unit mounted in a chassis with a tube socket and a tube.

The method of mounting the bypass capacitor unit of the invention on the chassis, together with its associated tube socket, is best shown in Fig. 3 where the numeral 21 designates a portion of the chassis formed with an opening 22 into which the socket 23 fits. The lower body portion 24 of the socket 23 projects below the chassis 21 and the opening in the ring 10 fits over it. The openings 18 and the holes in pads 20 are aligned with openings in the chassis 21 and the socket support 24 through which screws 25 fit to hold the socket and the capacitor unit to the chassis in such relative positions that the lugs 17 are conveniently located with respect to the pin lugs 26 of the socket 23 associated with the electrode of the tube 27 that the particular capacitor unit is desired to bypass to ground.

Figure 4:
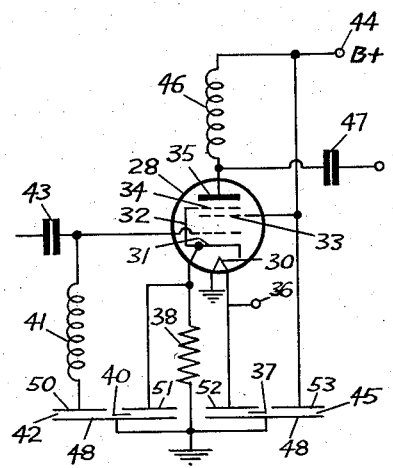
Fig. 4 is a schematic diagram of a circuit utilizing such a capacitor unit.

The use of such a bypass capacitor unit in a representative amplifier stage is shown in Fig. 4 in the form of a schematic diagram of such a stage of amplification in which the reference numeral 28 designates an electron discharge device, in this case a pentode, having a filament 30, a cathode 31, a first or control grid 32, a second or screen grid 33, a third or suppressor grid 34, and a plate 35. One end of the filament 30 is connected to ground and the other is connected to a terminal 36 that may be connected to a source of heater voltage and is bypassed to ground through a capacitor 37, which may be one of the sections of the bypass capacitor unit of the invention. The cathode 31 is connected to ground through a resistor 38 and coupled to ground through a capacitor 40, which may be a second section of a capacitor unit of the invention. The first or control grid 32 is coupled to ground through an inductance 41 and a capacitor 42 which again may be a third section of a capacitor unit of the invention. The grid 32 is also coupled to the source of input signals through a capacitor 43. The screen grid 33 is connected to a source of positive potential, represented by a terminal 44, and is bypassed to ground through a capacitor 45, which again may be a fourth section of a capacitor unit of the invention. The plate 35 is connected to the terminal 44 through an inductance 46 and is also bypassed to ground through the capacitor 45 and is coupled to the output through a capacitor 47. The lower plate 48 of each of the above-mentioned capacitors 37, 40, 42, and 45 can be the annular ring 10 or the capacitor unit shown in Figs. 1 and 2, and the upper plates 50, 51, 52 and 53, respectively, of each of these capacitors may be considered as the upper conductive coating 16 on one of the pieces 15 of dielectric.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A plurality of capacitors comprising an annular plate of conductive material formed with an inner and outer flange projecting from one side of the plane of the plate formed with a lug, a layer of insulating material on said plate, discrete conductive coatings on said layer of insulating material isolated from said plate and flanges, and an electrical connector lug attached to each of said conductive coatings.

2. A capacitor comprising an annular plate of conductive material formed with an opening dimensioned to receive the socket of the type adapted to receive pins attached to the electrodes of an electron discharge device, said plate formed with an inner and an outer flange projecting from one side of the plane of the plate to form a trough, a layer of insulating material on the bottom of said trough, a conductive coating on said layer of insulating material isolated from said trough, an electrical connector lug attached to said conductive coating, said lug adapted to be connected to said socket and openings in the annular plate positioned to receive the fastenings that hold the socket to the chassis.

References Cited in the file of this patent

UNITED STATES PATENTS

| | | |
|---|---|---|
| 934,714 | Denieport | Sept. 21, 1909 |
| 1,690,676 | Gilling | Nov. 6, 1928 |
| 2,348,693 | Minnium | May 9, 1944 |
| 2,408,910 | Burnham | Oct. 8, 1946 |
| 2,472,021 | Mitchell | May 31, 1949 |
| 2,496,095 | Kallmann | Jan. 31, 1950 |
| 2,706,798 | Kodama | Apr. 19, 1955 |

FOREIGN PATENTS

| | | |
|---|---|---|
| 110,916 | Australia | June 26, 1940 |